BEST AVAILABLE COPY

G. A. WEHNER.
STEERING WHEEL LOCK.
APPLICATION FILED AUG. 2, 1920.

1,387,218.

Patented Aug. 9, 1921.
3 SHEETS—SHEET 1.

WITNESSES

INVENTOR
Geo. A. Wehner,
BY
ATTORNEYS

G. A. WEHNER.
STEERING WHEEL LOCK.
APPLICATION FILED AUG. 2, 1920.
1,387,218.
Patented Aug. 9, 1921.
3 SHEETS—SHEET 2.
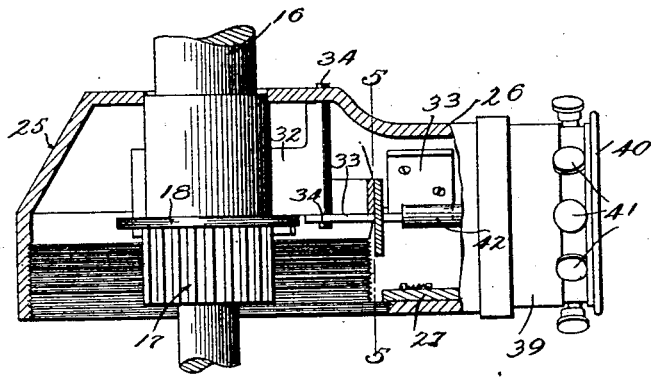
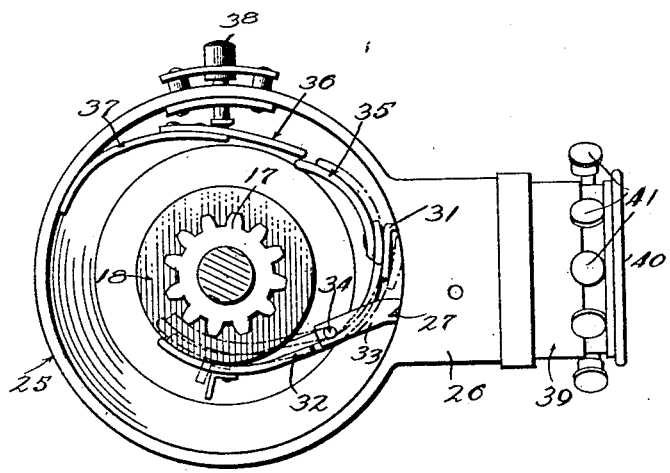
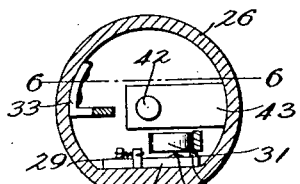
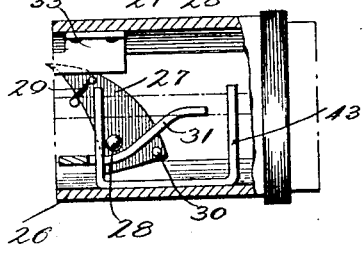
INVENTOR
Geo. A. Wehner,
WITNESSES
BY
ATTORNEYS

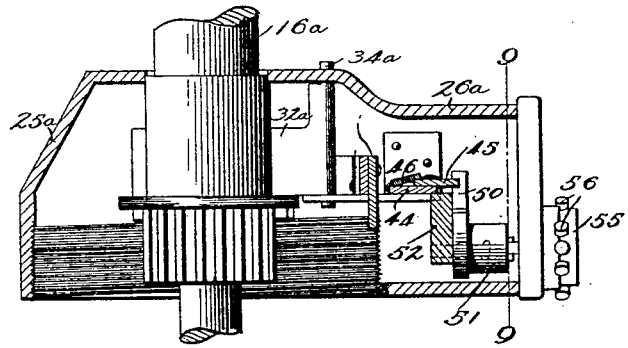
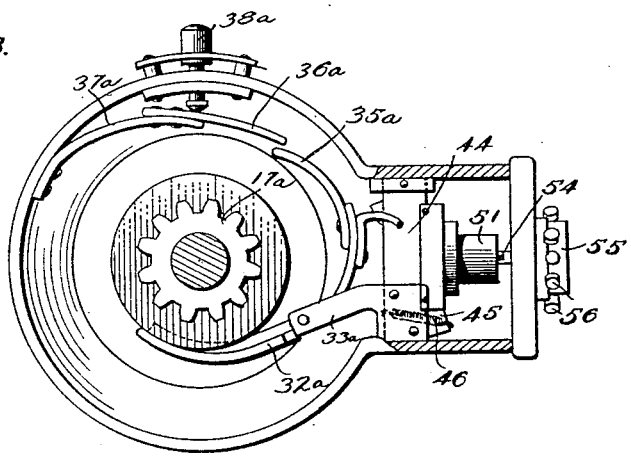
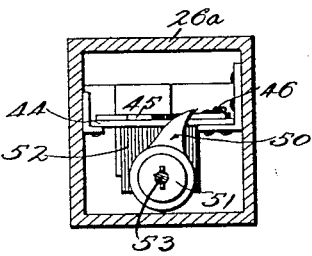
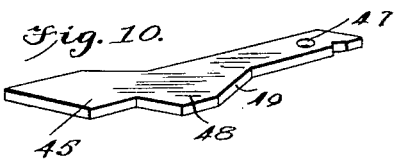

UNITED STATES PATENT OFFICE.

GEORGE ANTHONY WEHNER, OF SAVANNAH, GEORGIA.

STEERING-WHEEL LOCK.

1,387,218.  Specification of Letters Patent.  Patented Aug. 9, 1921.

Application filed August 2, 1920. Serial No. 400,843.

*To all whom it may concern:*

Be it known that I, GEORGE ANTHONY WEHNER, a citizen of the United States, and a resident of Savannah, in the county of Chatham and State of Georgia, have invented certain new and useful Improvements in Steering-Wheel Locks, of which the following is a specification.

My present invention relates generally to steering wheel locks, and more particularly to locks for that type of steering connection including a shaft supporting post with respect to which the steering wheel is movable vertically for the purpose of disengaging its shank carried gear from the gear at the upper end of the steering shaft, and my primary object is to provide a simple, inexpensive mechanism carried by a cap engageable with and disengageable from the gear housing of the steering post, whereby the steering wheel may be latched in its active position in a readily releasable manner and locked in its raised or elevated position where it is inactive, the means being of such nature as will properly coöperate with a permutation or keyless lock structure of the general character shown in my Patent No. 1,103,116, granted July 14, 1914.

Further and more particular objects will be understood in the course of the following description of my invention, reference being had to the accompanying drawings which form a part of this specification, and in which—

Fig. 3 is a vertical section taken through the cap and parts supported thereby at right angles to the section of Fig. 2;

Fig. 4 is a bottom plan view of the parts shown in Fig. 3;

Fig. 5 is a vertical section taken substantially on the line 5—5 of Fig. 3;

Fig. 6 is a horizontal section taken on the line 6—6 of Fig. 5;

Fig. 7 is a vertical longitudinal section illustrating the slightly modified form;

Fig. 8 is a bottom plan view, partly broken away and in section;

Fig. 9 is a vertical transverse section taken on the line 9—9 of Fig. 7;

Fig. 10 is a detail perspective view of the pivoted releasing lever utilized in the modification.

Figure 1:
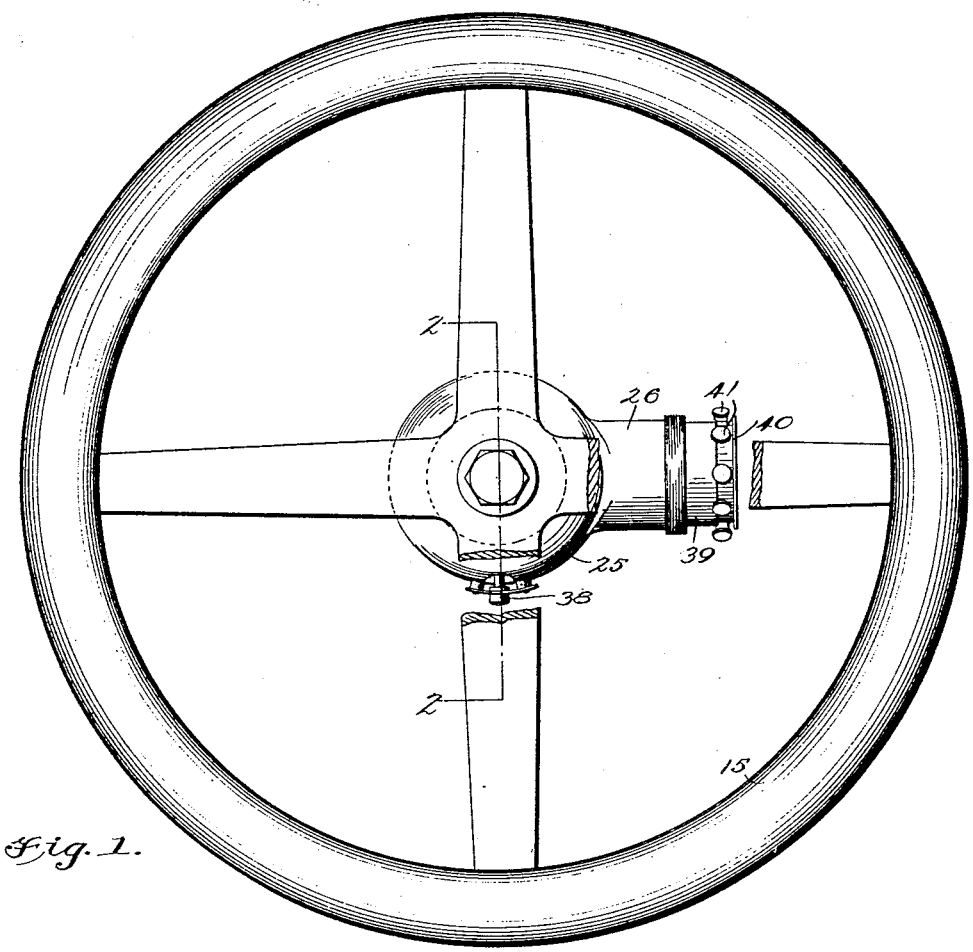
Figure 1 is a top plan view of a steering mechanism equipped with my improvements, and partly broken away.

Referring now to these figures, my invention relates to that form of steering mechanism in which the steering wheel 15 is secured to a shank 16 having thereon a gear 17 and a collar 18 above the gear. The lower end of the shank 16 rotatably interfits the tubular upper end 19 of a steering shaft, extending vertically in the steering post 20 and provided with an upper head 21 which carries spaced pinions 22 between the shank 16 and the inner toothed face 23 of the gear housing 24 integral with the upper end of the post 20. In the lowermost position of the shank 16 its gear 17 meshes with the pinions 22 and by its rotation serves to rotate the steering shaft, in view of the abutment the steering shaft pinions 22 have in connection with the toothed inner surface of the housing 24.

In accordance with my invention a cap 25 is threaded around and upon the gear housing 24 and receives the shank 16 rotatably through its top, the latter being spaced vertically above the shank collar 18 a sufficient distance to permit the shank gear 17 to be pulled upwardly out of engagement with the pinions 22 by grasping the steering wheel 15 and lifting the latter.

The cap 25 has a laterally projecting extension 26, and upon the base of this extension a dog 27 is pivoted at 28. This dog is normally held in its inner position under control of a spring 29 so as to present its inner pointed end against the threaded external surface of the housing 24, for movement within a notch or the like formed on the external surface of the housing when the cap 25 is screwed fully into place. This dog 27 is so positioned that it is yieldable on the surface of the housing when the cap is screwed thereon, but its engagement with the housing under normal circumstances prevents unscrewing of the cap. The outer portion of the dog 27 has an upstanding releasing pin 30 engageable by the projecting tail portion 31 of a combined latch and locking arm 32, when the latter is moved to inactive position, in order to shift the dog against the tension of its spring 29 and out of effective engagement with the housing 24 to permit the cap 25 to be unscrewed.

Attached within the extending portion 26 of the cap 25 is a bracket 33, whose inwardly projecting portion has a bearing aperture and coöperates with the apertured top of the casing 25 in supporting upper and lower trunnions 34 of the combined latch and locking arm 33, the latter of which is curved within the cap to extend partially around the steering wheel shank 16 and is so disposed that its effective end is movable by gravity into engagement with either the shank 16 or its gear 17, respectively, above and below the collar 18, in the active and inactive position of the steering connections. With the parts in the normal position, the arm 32, extending by gravity into engagement with the steering wheel shank above the collar 18, by virtue of the inclined position of the steering post 20 acts simply as a latch to prevent accidental vertical movement of the steering wheel and its shank and, therefore, accidental disengagement of the gear 18 on account of jolts and jars of a vehicle on the road. In this position the free end 35 of the latching and locking arm extends into the path of inward movement of a latch releasing piece 36 whose supporting spring 37 is secured to the inner surface of the cap 25. This latch releasing piece is engaged by the inner end of an inwardly pressable fingerpiece or push pin 38 mounted through the wall of the cap 25 so that inward movement of the push pin by the operator serves to thrust the latch releasing piece 36 inwardly against the tension of its spring 37 to engage and press inwardly against the free end 35 of the locking and latching arm 32. When this happens the arm swings on its pivot trunnions 34 so that its effective end is moved outwardly away from the steering wheel shank 16 to a point beyond the edge of the collar 18, thus permitting the steering wheel and its shank with the gear 17 to be elevated and the gears disconnected. When this takes place release of the push button 38 permits the effective end of the curved locking and latching arm 32 to again swing by gravity, this time into engagement with the gear 17 at a point below the collar 18, thus arresting the lowering movement of the steering wheel shank and securing the parts in their elevated inactive position. In so doing it will be noted that the effective end of the locking and latching arm 32 moves inwardly to a greater extent than its inner movement at a point above the collar 18, as will be seen by comparison of the full and dotted lines in Fig. 4, and it will be further noted that when the effective end of the arm shifts inwardly against the gear 17, its opposite free end 35 is moved out of the path of movement of the latch releasing member 36.

Thus the arm 32, which acts as a latch, releasable by the push button 38, when engaged with the steering wheel shank at a point above the collar 18, becomes a locking member when shifted to engage the gear 17 below the collar 18, unaffected by inward movement of the push button 38.

Attached to the outer end of the extension 26 of the cap is the casing 39 of a permutation lock 40, having an annular series of depressible fingerpieces 41, depression of certain of which permits of rotation of the casing 39 and brings about lengthwise movement of an axial pin 42 extending through apertured portions of a bearing bracket 43, with its inner end adjacent to the locking and latching arm 32. Thus with the parts in the locked position last described the operator, aware of the proper permutation members 41 to be depressed, may rotate the barrel or casing 39 and bring about inward shifting movement of the axial pin 42 which serves to rock the locking arm 32 to released position, permitting the steering wheel and its shank to be lowered once more into active position.

It is to be noted that when the locking and latching arm 32 is shifted to released position either from its latching position releasable by the push button 38 or its locked position releasable only through manipulation of the permutation lock 40, the extending tail portion 31 of this arm 32 engages the pin 30 of the dog 27 and locks the dog inwardly against the tension of its spring 29 out of engagement with the toothed and notched periphery of the housing 20 so that when the arm 32 is in released position the cap may be unscrewed from the gear housing.

Figure 2:
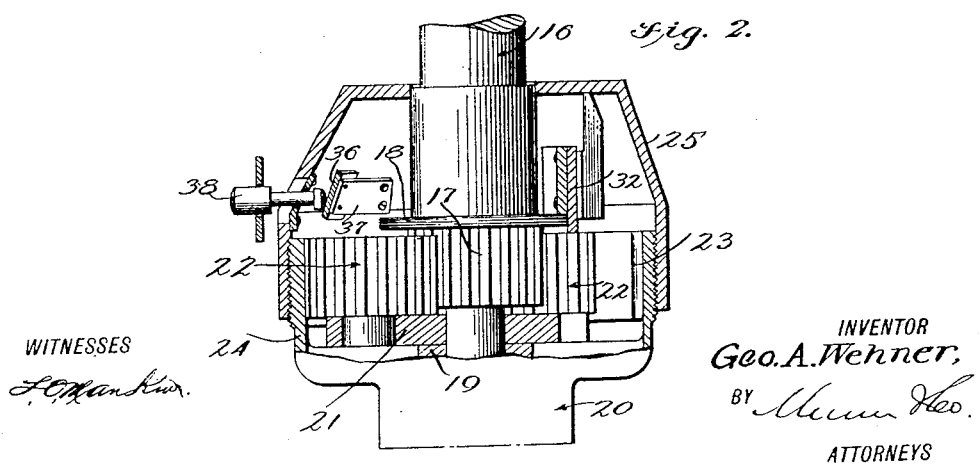
Fig. 2 is a vertical transverse section taken through the locking mechanism and adjacent parts, substantially on the line 2—2 of Fig. 1.

In the form of the invention shown in Figs. 7 to 10, inclusive, the cap 25ᵃ has within its extension 26ᵃ a cross bracket 44 serving as a support for a horizontally shiftable lock releasing piece 45, normally controlled by a spring 46 to hold the same free of engagement with the combined locking and releasing arm 32ᵃ. This lock releasing piece 45, as seen in Fig. 10, has an opening 47 adjacent to one end by which it is pivoted upon the bracket 44 and is also provided at one side with a projection 48 having an inclined shoulder 49 engageable by the upwardly projecting finger 50 mounted on a rotating barrel 51. This barrel is journaled on a pin projecting from a depending part 52 of the bracket 44 and its outer end has a socket 53 with diametrical slots to receive the feathered inner end 54 of the axial pin of a permutation lock 55 including a rotatable casing having an annular series of depressible fingerpieces 56, and unlike the permutation lock of Figs. 1 to 6 in that its feathered end 54 rotates instead of moving lengthwise. In the operation of the modified form rotation of the permutation lock communicates a similar movement to the barrel 51 through the feathered axial pin so that shifting movement of the finger 50 against the inclined shoulder 49 moves the lock releasing piece 45 inwardly on its pivot so as to shift the locking and latching arm 32$^a$ to released position. In Fig. 8 the parts are shown in the normal latched position, but it is to be understood that when one end of lever 32$^a$ engages gear 17$^a$, its opposite end will be positioned against the free end of the releasing piece 45 for actuation by the latter as previously described. The modified form illustrated and described to the above extent is therefore merely to adapt a permutation lock, the pin of which rotates instead of moving lengthwise, and it is quite obvious that other slight modification and changes may be made for the purpose of adapting still other forms of permutation locks, although I prefer a lock whose construction is of the general nature described and claimed in my patent above referred to.

I claim:

1. In combination with a vertically movable steering wheel and its gear-carrying shank, having a collar, of a combined latching and locking lever pivotally supported intermediate its ends and shiftable by gravity to engage the shank above and below its collar for respectively holding the same in active and inactive positions, freely movable means including a push button, engageable with the lever in its latching position above the collar to release the same, and out of the path of movement of which means the lever is positioned when said lever is in locking engagement with the shank beneath the collar, and a release lock mechanism having means for engaging and releasing the said lever when the latter is in locked position.

2. The combination with a vertically movable steering wheel and its gear-carrying shank, having a collar, of a combined latching and locking lever movable to engage the shank above and below its collar for respectively holding the same in active and inactive positions, freely movable means engageable with the lever in its latched position above the shank collar to release the same and out of the path of movement of which means the lever is movable when said lever is shifted to its locked position below the collar, and lock controlled means for engaging and releasing the lever when in its locked position below the collar, as described.

3. The combination with a vertically movable steering wheel and its gear-carrying shank, having a collar, of a gravity actuated lever movable to engage the shank above and below the collar for respectively holding the same in active and inactive positions, freely movable latch releasing means engageable with the said lever when positioned above the collar, to release the same, and lock-controlled means engageable with the lever in its locked position below the collar for releasing the same.

4. The combination with a vertically movable steering wheel and its gear-carrying shank having a collar, of a lever movable to engage the shank above and below the collar and operating respectively as a latch and a lock holding the shank in active and inactive positions, freely movable means for releasing the lever when in latched position and out of the path of movement of which means the lever is shiftable when said lever is moved into locked position, and lock-controlled means for releasing the lever when in the locked position.

5. The combination with a vertically movable steering wheel and its shank having a gear and a collar, of a gravity actuated lever movable to engage the shank above and below the collar and operating respectively as a latch and a lock holding the shank in active and inactive positions, a keyless lock mechanism including means operable to release the lever in its latched and locked positions, and freely movable, and manually actuated means for releasing the lever in its latched position.

6. The combination with a vertically shiftable steering wheel shank having a gear and a collar, of a lever pivoted intermediate its ends and shiftable by gravity into active position above and below the collar for respectively latching the shank in its lower active position and locking the shank in its upper inactive position, means including a fingerpiece, engageable with the opposite end of the lever in its latched position to release the same, and out of the path of movement of which means the said free end of the lever is shiftable when the lever moves to its locked position, and lock controlled means engageable with the lever to release the same from locked position.

GEORGE ANTHONY WEHNER.